United States Patent [19]

Kosugi

[11] 4,442,864

[45] Apr. 17, 1984

[54] ELECTROMAGNETIC SWITCHING VALVE

[75] Inventor: Seiji Kosugi, Soka, Japan

[73] Assignee: Shoketsu Kinzoku Kogyo Kabushiki Kaisha, Tokyo, Japan

[21] Appl. No.: 300,560

[22] Filed: Sep. 9, 1981

[51] Int. Cl.³ .................... F16K 11/16; F15B 13/044
[52] U.S. Cl. ......................... 137/625.27; 137/625.65
[58] Field of Search ................. 137/596.17, 625.27, 137/625.64, 625.65

[56] References Cited

U.S. PATENT DOCUMENTS

| | | | |
|---|---|---|---|
| 2,436,992 | 3/1948 | Ernst | 137/625.65 X |
| 3,043,336 | 7/1962 | Parent | 137/625.27 X |
| 3,542,333 | 11/1970 | Stampfli | 137/625.27 X |
| 3,921,666 | 11/1975 | Leiber | 137/596.17 X |
| 3,989,063 | 11/1976 | Brouwers | 137/596.17 |

FOREIGN PATENT DOCUMENTS 1179068  10/1964  Fed. Rep. of Germany ................... 137/625.65

Primary Examiner—Robert G. Nilson
Attorney, Agent, or Firm—Oblon, Fisher, Spivak, McClelland & Maier

[57] ABSTRACT

An electromagnetic switching valve wherein an appropriate relation is set for the resilient forces between a spring for actuating a valve body that closes or releases the passage of fluid and a spring for actuating a movable core that is incorporated with the valve body and moved by electromagnetic operation force, thereby providing a power saving structure with no additional components and increased fluid discharging capacity.

1 Claim, 5 Drawing Figures

ELECTROMAGNETIC SWITCHING VALVE

BACKGROUND OF THE INVENTION (1) Field of the Invention

This invention concerns an electromagnetic switching valve for switching the flowing direction of fluid by electromagnetic operation force.

(2) Description of the Prior Art

Electromagnetic switching valves known so far have generally been constituted as shown in FIG. 1, wherein a movable core 102 having a feed valve body 103 and a discharge valve body 104 is driven by ON/OFF operation of a coil 101 in a solenoid operation section on a valve main body 100, to thereby open and close a feed valve seat 105 and a discharge valve seat 106 alternately. Upon energizing, the discharge valve seat 106 communicating with a discharge port 107 is closed to establish a fluid channel from an input port 108 to an output port 109 and, upon deenergizing, the feed valve seat 105 is closed to establish a fluid channel from the output port 109 to the discharge port 107. In the electromagnetic switching valve of the type referred to above, since the resilient force of a spring 110 for actuating the feed valve body 103 is set greater than that of a return spring 111 and the movable core 102 has to be attracted, upon energizing, against a great resilient force of the return spring 111, it is necessary to employ a compact and low-priced solenoid operation section so that the solenoid be operated in a range where the electromagnetic attraction force is relatively strong, that is, it has to be used with a small stroke of the movable core. Thus, it has an inherent deficiency that the stroke of the movable core is greatly restrained and the fluid discharge performance in the feed valve seat 105 and the discharge valve seat 106 is limited significantly. If the stroke of the movable core is extended in order to increase the fluid discharge performance, the movable core has to overcome the resilient force of the return spring in weak range of the electromagnetic attraction force, which results in various defects such as increase in the size of the solenoid coil 101 or increase in the electric power consumed therein.

Further, in order to provide the feed valve seat 105 and the discharge valve seat 106 with sufficient fluid passing performance, the stroke between the feed valve body 103 and the feed valve seat 105 having a bore diameter $d_1$ is set to $\frac{1}{4}d_1$ and, accordingly, the stroke between the discharge valve body 104 and the discharge valve seat 106 having a bore diameter $d_2$ has to be set to $\frac{1}{4}d_2$. Therefore, if it is intended to set the bore diameter $d_2$ greater than the bore diameter $d_1$, that is, for increasing the discharge performance by accelerating the starting of an actuator to be controlled by the valve, the stroke of the movable core has to be set corresponding to the bore diameter $d_2$. Accordingly, for enlarging the bore diameter $d_2$ from the state shown in FIG. 1 in order to improve the discharge performance, the stroke of the movable core 102 must necessarily be extended. However, the machines heretofor in use are disadvantageous, in such a case, in that the distance between the two valve seats 105 and 106 has to be increased and in that such extension of the stroke, although important for the discharge valve seat 106, is quite useless and very much irrational in view of the feed valve seat 105 of a smaller bore diameter.

SUMMARY OF THE INVENTION

The present invention has been accomplished for overcoming the foregoing problems and it is a principal object thereof to provide an electromagnetic switching valve of a electrical power saving structure, in which the resilient force of a return spring is reduced by that of a spring for actuating a feed valve body in a range where a movable core is far from a stationary core and thus the attraction force of the solenoid operation section is weak, thereby enabling it to attract the movable core surely with a small attracting force and to use a small-sized solenoid coil with reduced power consumption.

It is another object of the present invention to provide an electromagnetic switching valve which can increase the fluid discharging performance in which the stroke of the movable core is extended thereby enabling to increase the bore diameter in the discharge valve seat.

It is a further object of the present invention to provide an electromagnetic swiching valve in which a large resilient force of the return spring is exerted as it is on the movable core at the attraction end of the movable core, thereby enabling to return the movable core surely upon deenergizing even with enlarged bore diameter in the discharge valve seat.

It is a further object of the present invention to provide an effective electromagnetic switching valve having no useless stroke of the movable core, in which the stroke of the movable core for closing the feed valve seat is set longer than the stroke required for closing the feed valve seat by the feed valve body, thereby enabling to extend the stroke of the movable core without enlarging the distance between the two valve seats and distribute the stroke for the opening and closing of the feed valve seat and for the opening and closing of the discharge valve seat in accordance with the bore diameter in each of the valve seats.

It is a still further object of the present invention to provide an electromagnetic switching valve which can apply also to a pilot valve which can increase the response speed of the switching valve and improve the fluid discharging performance.

In order to attain the foregoing objects, the electromagnetic switching valve of this invention comprises a valve main body having an input port and an output port for fluid, a valve chamber defined in the valve main body by a guide cylinder of a solenoid operation section and a stationary core fitted thereto, a feed valve seat between the input port and the output port and a discharge valve seat on the stationary core communicating with a fluid discharge port provided opposed relation to each other in the valve chamber, a feed valve body for opening and closing the feed valve seat and a discharge valve body for opening and closing the discharge valve seat each provided inside of the movable core contained movably in the valve chamber, a spring disposed inside of the movable core for actuating the feed valve body toward the feed valve seat, and a return spring mounted in the valve chamber for actuating the movable core in the direction of closing the feed valve seat with a resilient force greater than that of the spring, with the stroke of the movable core for closing the feed valve seat being set greater than the stroke required for closing the feed valve seat by the feed valve body.

BRIEF DESCRIPTION OF THE DRAWINGS

The objects, features and advantages of the present invention will be made more clear by the following detailed descriptions referring to the accompanying drawings, wherein.

DESCRIPTION OF PREFERRED EMBODIMENT

Figure 1:
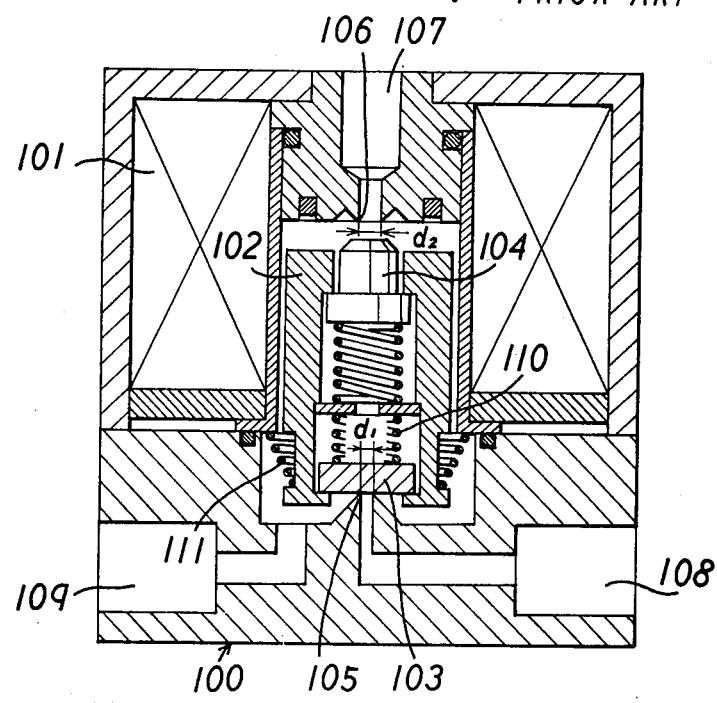
FIG. 1 is a cross sectional view of an electromagnetic switching valve of the prior art.
Figure 2:
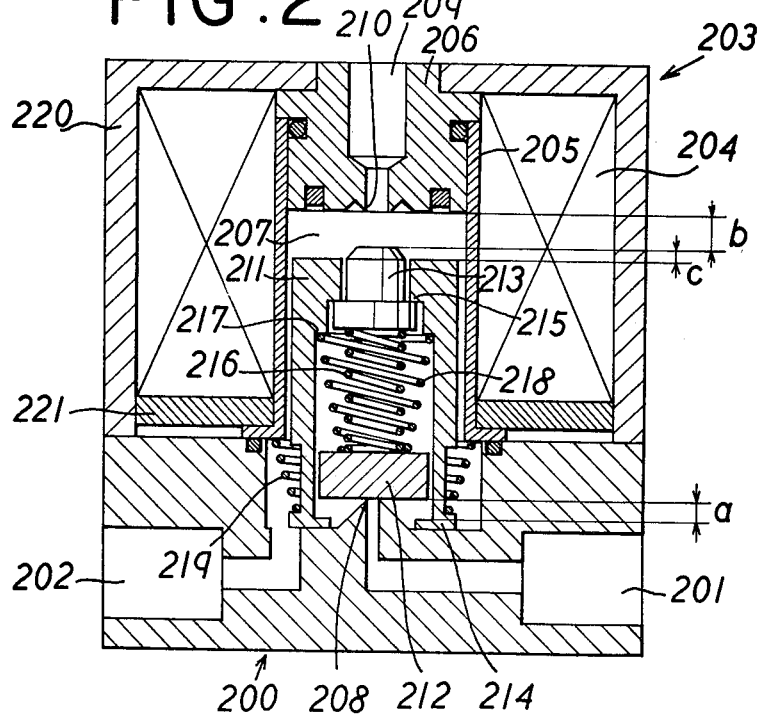
FIG. 2 is a cross sectional view of an electromagnetic switching valve embodying the present invention.

Referring to FIG. 2, a valve main body 200 has an input port 201 and an output port 202 for fluid flow, and a valve chamber 207 is defined in the valve main body 200 by a guide cylinder 205 provided therearound with a coil 204 of a solenoid operation section 203 and a stationary core 206 fitted to the upper end thereof. A feed valve seat 208 is formed, on the valve main body 200, between the input port 201 and the output port 202, and a discharge valve seat 210 communicating with the fluid discharge port 209 thereabove is formed in the stationary core 206 in opposed relation to the feed valve seat 208. A feed valve body 212 and a discharge valve body 213 are disposed inside of the movable core 211 contained movably within the valve chamber 207 for opening and closing the feed valve seat 208 and the discharge valve seat 210, respectively, in such a manner that they are restricted from moving outwardly and made movable inwardly by a stopper 214 and an engaging step 215 respectively. An inter-valve spring 216 is resiliently mounted between the valve body 212 and the valve body 213 for actuating them in an outwardly direction from each other, an auxiliary spring 218 is mounted between the feed valve body 212 and the spring seat 217 of the movable core 211 for actuating the feed valve body 212 in the same direction as that by the inter-valve spring 216 and, further, a return spring 219 is mounted between the movable core 211 and the guide cylinder 205 for actuating the movable core 211 in the direction closing the feed valve seat 208.

The resilient force of the return spring 219 is set greater than the combined resilient force of the inter-valve spring 216 and the auxiliary spring 218, and the stroke of the movable core 211 is set greater than the closing stroke of the valve seats 208 and 210 by the two valve bodies 212 and 213. By the setting for the spring forces and the stroke, where the two valve bodies 212 and 213 close the feed valve seat 208 and the discharge valve seat 210 at the stroke ends of the movable core 211, respectively, the valve bodies 212 and 213 are somewhat compressed and retracted inwardly to keep the resilient force of the inter-valve spring 216 and of the auxiliary spring 218 exerted on the movable core 211.

In the drawing, are also shown a magnetic frame 220 and a magnetic flux plate 221.

In a state shown in FIG. 2 wherein the solenoid coil 204 is not energized in a electromagnetic switching valve having the foregoing constitution, the movable core 211 keeps its lowermost position in which the stopper 214 abuts against the bottom surface of the valve chamber 207 while being urged by the return spring 219, and the feed valve body 212 is urged to contact and close the feed valve seat 208 and the discharge valve body 213 is positioned to keep open the discharge valve seat 210. Accordigly, fluid fed from the input port 201 is interrupted, while fluid from the output port 202 is discharged out of the valve chamber 207 by way of the discharge valve seat 210 through the discharge port 209.

In the switching state referred to above, the feed valve body 212 keeps a somewhat retracted position against the resilient force of the inter-valve spring 216 and of the auxiliary spring 218 while being urged to the feed valve seat 208, whereby the upwardly resilient force resulted from the compression in the two springs 216, 218 is exerted on the movable core 211. Consequently, the resilient force of the return spring 219 is subtracted from the resilient force of the two springs 216 and 218 and the resultant force $f_1$ is exerted, as a whole, downwardly on the movable core 211 and the entire force $f_1$ is shown by the reference I in FIG. 5.

Figure 3:
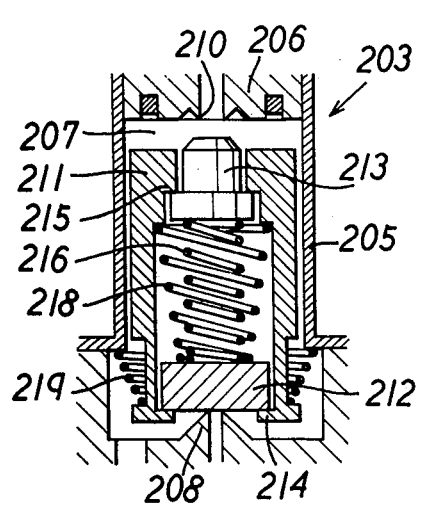
FIG. 3 and FIG. 4 are cross section views of a part of the electromagnetic valve, each in different switching state respectively.

Then, upon energizing the coil 204, the movable core 211 is attracted toward the stationary core 206 by the magnetic flux passing through a magnetic circuit comprising magnetic frame 220, stationary core 206, movable core 211 and magnetic flux plate 211. Referring specifically to this state, the movable core 211 is at first attracted against the force $f_1$, moves by the stroke a and arrives at a position shown in FIG. 3, where the stopper 214 abuts against the feed valve body 212. In this case, the attraction characteristic of the solenoid operation section 203 is as shown by the curve A in FIG. 5. Although only the low attraction portion can be used at the start of the attraction, since a small resistive force $f_1$ is exerted on the movable core 211 due to the relation of the resilient forces between each of the springs as stated above, the movable core 211 can be actuated surely even with a small attraction force and thus the stroke for the movable core can be extended. The downward resistive force exerted on the movable core 211 is gradually increased as each of the springs 216, 218 and 219 is compressed and it is as shown by the reference II in FIG. 5 at the instant the stopper 214 abuts against the feed valve body 212. Then, immediately before the opening of the feed valve seat 208 when the resilient force of the inter-valve spring 216 and the auxiliary spring 218 is received on the stopper 214, the downward resistive force exerted on the movable core 211 is increased rapidly as shown by the reference III since the resistive force now comprises only that from the return spring 219.

Figure 5:
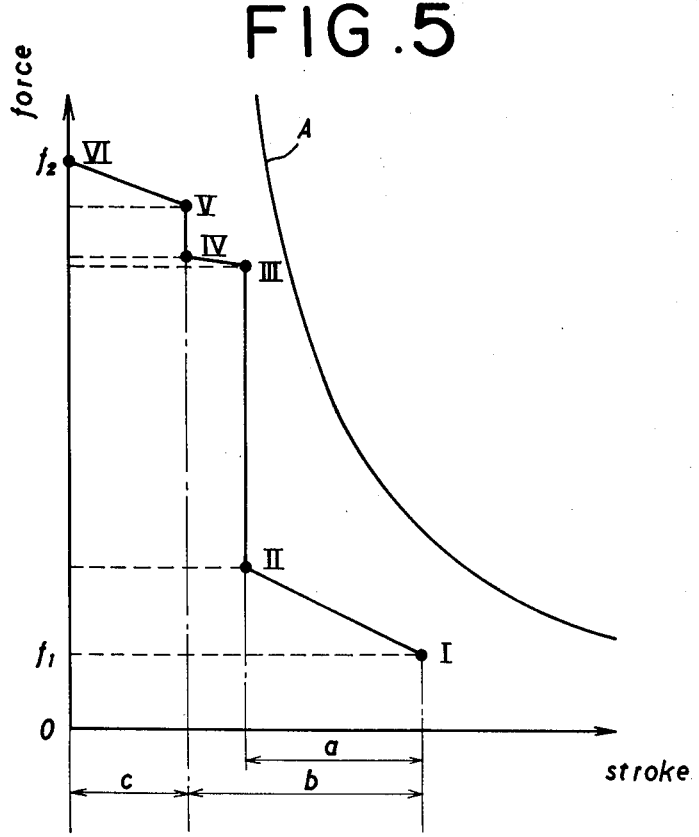
FIG. 5 is a chart showing the operational characteristics of a preferred embodiment according to the present invention.

In the succeeding stage during which the movable core 211 moves by the stroke b to abut the discharge valve body 213 against the discharge valve seat 210, the resistive force comprises only the resilient force of the return spring 219, which increases with the compression in the return spring 219 and changes as shown by the reference IV in FIG. 5.

Figure 4:
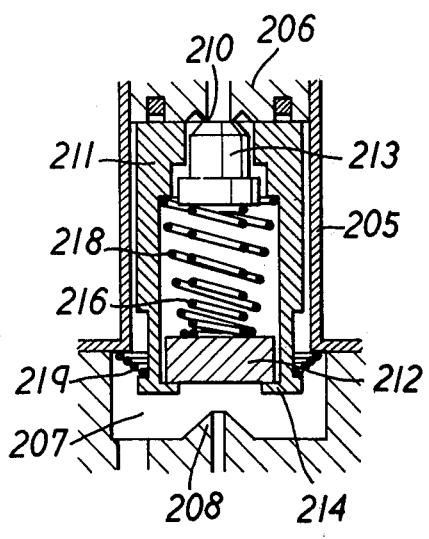

Then, when the movable core 211 is further attracted and the compression in the inter-valve spring 216 begins to act against the stationary discharge valve body 213 as shown in FIG. 4, the combined resilient force of the inter-valve spring 216 and the return spring 219 is now exerted as the resistive force acting on the movable core 211, and the resistive force changes as shown in the reference V–VI in FIG. 5. Since a great attraction force is exerted on the movable core 211 at a point where the movable core is attracted to some extent as apparent from the attraction characteristics shown in FIG. 5, the movable core 211 can surely be attracted while overcoming the resistive force if the latter is increased.

Then, at the stroke end of the movable core 211 where it further moves by the stroke c, the movable upper end of the core 211 abuts against the lower surface of the stationary core 206, wherein the discharge valve body 213 is urged to close discharge valve seat 210 and the feed valve 212 opens the feed valve seat 208. Thus, fluid from the input port 201 flows by way of the feed valve seat 208 and the valve chamber 207 to the output port 202.

Then, upon deenergizing of the coil 204, the movable core 211 starts to return with a great force actuated by both the return spring 219 and the inter-valve spring 216 which have stored great resilient force during compression, and therefore returning can be conducted surely even when the discharge valve seat 210 has a large bore diameter.

As explained above in detail, by the provision of the inter-valve spring 216 between the feed valve body 212 and the discharge valve body 213, and the auxiliary spring 218 between the feed valve body 212 and the movable core 211, the biasing force exerted on the valve bodies 212,213 to force them onto their respective valve seats 208,210 can be adjusted. Therefore, a relatively greater force can be applied by the inter-valve spring 216 and the auxiliary spring 218 to the feed valve body 212 which is acted upon by the high pressure of the inlet fluid, while a minimal biasing force can be applied to the discharge valve body 213 to which the fluid pressure in the valve chamber 207 acts as a back pressure.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electromagnetic switching valve, comprising:
   a valve main body including a valve chamber, an inlet port and an outlet port;
   a stationary core disposed in said valve main body and including a fluid discharge port, said stationary core disposed in said valve main body so as to form an end of said valve chamber;
   a guide cylinder disposed in said valve chamber adjacent said stationary core;
   a feed valve seat formed in said valve main body for fluidically interconnecting said inlet port to said outlet port via said valve chamber;
   a discharge valve seat formed in said stationary core in opposed relation to said feed valve seat and wherein said discharge valve seat is fluidically interconnected to said valve chamber and said fluid discharge port;
   a movable core reciprocatably disposed in said guide cylinder;
   a discharge valve body reciprocatably disposed in said movable core and adapted to cooperate with said discharge valve seat for opening and closing thereof;
   a feed valve body reciprocatably disposed in said movable core and adapted to cooperate with said feed valve seat for opening and closing thereof;
   a return spring disposed in said valve chamber and adapted to cooperate with said guide cylinder and said movable core to urge said movable core in a direction for closing said feed valve seat and to cause said discharge valve body and said feed valve body to move to decrease a linear distance therebetween to less than a predetermined maximum value;
   an inter-valve spring compressedly disposed between said discharge valve body and said feed valve body and adapted to cooperate therewith so as to cause said discharge valve body and said feed valve body to move to increase said linear distance therebetween to said predetermined maximum value;
   an auxiliary spring disposed in said movable core and adapted to cooperate with said movable core and said feed valve body to urge said feed valve body away from said discharge valve body and wherein a force of said return spring is greater than a combined force of said inter-valve spring and said auxiliary spring; and
   means for generating an electromagnetic force such that when said electromagnetic force generating means is deenergized said movable core abuts a bottom of said valve chamber due to said force of said return spring, said feed valve body closes said feed valve seat due to said combined force of said inter-valve spring and said auxiliary spring and said linear distance between said discharge valve body and said feed valve body is less than said predetermined maximum value, and when said electromagnetic force generating means is energized said movable core is drawn into abuttment with said stationary core and said discharge valve body to close said discharge valve seat due to an inter-valve spring force.

* * * * *